United States Patent [19]

Niedecker

[11] 4,165,593

[45] Aug. 28, 1979

[54] PROCESS FOR ATTACHING A HANGER LOOP TO A WRAPPER SECTION CLOSED WITH A U-SHAPED CLIP

[76] Inventor: Herbert Niedecker, am Ellerhang 6, 6240 Konigstein 2, Fed. Rep. of Germany

[21] Appl. No.: 866,969

[22] Filed: Jan. 4, 1978

[30] Foreign Application Priority Data

Jan. 8, 1977 [DE] Fed. Rep. of Germany ....... 2700641

[51] Int. Cl.² .............................................. B65B 61/14
[52] U.S. Cl. ....................................... 53/413; 53/417; 53/134; 53/138 A; 29/243.57
[58] Field of Search ............. 53/413, 417, 134, 138 A; 24/16 R, 30.5 R; 248/95, 317, 359; 206/806; 229/54 C; 150/12; 29/243.56, 243.57

[56] References Cited

U.S. PATENT DOCUMENTS

| 2,462,957 | 3/1949 | Gunn ....................................... 53/134 |
| 3,565,640 | 2/1971 | Dohlman ............................... 248/317 |
| 3,951,262 | 4/1976 | Niedecker ............................ 206/343 |
| 4,044,450 | 8/1977 | Raudys et al. ...................... 53/138 A |

Primary Examiner—John Sipos

Attorney, Agent, or Firm—Sprung, Felfe, Horn, Lynch & Kramer

[57] ABSTRACT

The invention relates to convoluting a doubled, unknotted length of thread about a clip which is closed about the gathered mouth of a tubular wrapper such as a sausage casing to form a loop by which the sausage can be hung. The clip secures the loop to the casing and the weight of the sausage merely makes a tighter grip. An apparatus to produce the loop secured to the clip and casing comprises a punch, a clip guide having opposite grooves for guiding the clip legs, a die for receiving each clip and for cooperating with the punch to close the clip around the gathered mouth end of the wrapper, a thread-withdrawing device disposed beside the clip feed path, a thread snubber and a looping hook, a winding head which is axially displaceable into the feed path for the clip, the winding head being provided with a groove in its end face and a thread-receiving recess transverse to the axis of the winding head and somewhat set back from its end face, part of the groove and the thread-receiving recess defining a hook, and means for rotating the winding head so as to form an eyelet in the thread independent of the loop, advance of the clip causing one of the clip legs to enter the eyelet and the clip thereafter closing.

1 Claim, 11 Drawing Figures

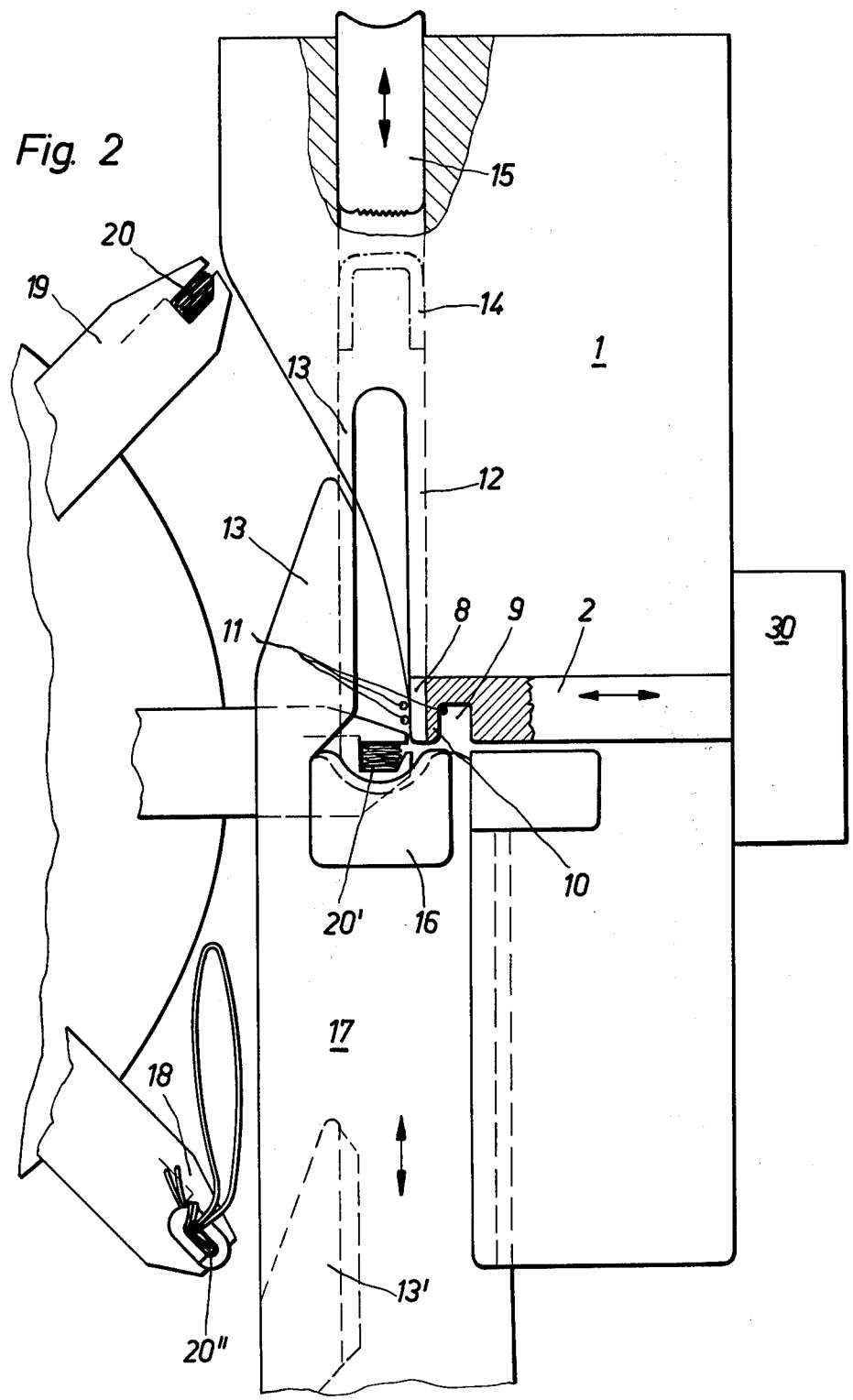

PROCESS FOR ATTACHING A HANGER LOOP TO A WRAPPER SECTION CLOSED WITH A U-SHAPED CLIP

This invention relates to a tubular wrapper which is closed with a U-shaped clip, and a process and apparatus for attaching a hanger loop to a gathered end of a tubular wrapper and for closing the latter with a U-shaped clip.

In such processes, hanger loops are usually attached in that prefabricated hanger loops are laid by hand into the closing clips. For this purpose the operator must take each hanger loop from a supply thereof and in step with the closing machine, which operates automatically in most cases, the operator must place the hanger loop into the clip before the latter is closed around the end of the gathered wrapper. This operation requires high skill because the gathering and closing means leave only a small space for the access to the clip. The operation also involves a high risk of injury unless the hanger loop is placed into the clip exactly at the correct time. Because the singling of the hanger loop and the other manual operations depend on the skill of the operator and take some time even if the operator is highly skilled, the closing machine cannot be operated at the highest possible speed but the time required by the operator must be allowed for. For these reasons the process is rather uneconomical.

In view of the above, it has already been suggested to pre-assemble prefabricated hanger loops on a strap so that they can be mechanically supplied to the closing device (U.S. Pat. No. 3,951,262, issued Apr. 30, 1974). Whereas the main disadvantages of the manual insertion are avoided in this practice and much higher closing rates can be achieved, the process has the disadvantage that the hanger loops must still be prefabricated, that additional equipment is required to pre-assemble the hanger loops, and that additional means for feeding the pre-assembled hanger loops are required and must be controlled in synchronism with the closing machine. All these requirements may involve higher costs in the process defined first hereinbefore if the advantages which are due to the assembling of the loops are not required.

For this reason it has also been attempted to use hanger loops which are not prefabricated but are made directly at the closing device.

In a known process of that kind a thread loop is formed first in that the two ends of a length of thread are tied in a knot, the knotted length of thread is placed into the clip so that the knot is disposed beside one side of the clip, the wrapper end which has been gathered to form longitudinal creases is then placed into the clip so that the wrapper end protrudes from the clip on the side which is opposite to the knot, and the two legs of the clip are finally bent down onto the wrapper end which has been gathered to form creases (Opened German Specification No. 18 033 53).

Whereas the disadvantages of manual operation and the costs involved in fabricating, pre-assembling, and automatically supplying the loops are avoided in the last described process, the latter requires a complete loop-tying device so that the plant is more complicated and expensive.

Besides, the hanger loop will not be reliably fixed unless the knot is large enough and in direct contact with the closing clip. If these requirements are not met, e.g., because the knot lies in a crease of the gathered wrapper end, the knot may be pulled under load out of the clip so that the filled wrapper will fall down.

It has also been suggested to use a looped cord, which has not been knotted, and to apply a clip tightly around the gathered wrapper end and around the ends of the looped cord. For that purpose, a spreader is required, which is movable into the feed path of the gathered wrapper end and serves to spread the two side portions of the looped cord and to form half-loops, which extend at right angles to the spreading direction, as well as a looper, which serves to pull the short half-loop through the wider half-loop from the spreader and to pull the short half-loop tight beside the clip when the latter has been applied around the gathered wrapper end and the two ends of the looped cord (Printed German Application No. 16 32 109).

In that process, the looper, which has a pointed hook, must be moved closely past the gathered wrapper end so that the wrapper may be damaged when it has not been sufficiently gathered. Besides, the equipment is highly complicated and is also liable to be deranged because the looped cord is not taut throughout the operation. Moreover, the cord ends are simply tied in so that the hanger loop may be pulled out of the clip entirely or in part even as the hanger loop is attached. In that case a fixation by means of the one half-loop which has been pulled through is no longer ensured. Besides, that knot can easily become loose when the hanger loop is not loaded.

For this reason it is an object so to secure the hanger loops and the clip to a tubular wrapper that these disadvantages are avoided. It is also an object to provide a process which is of the kind described first hereinbefore and in which a hanger loop can be formed and can be reliably attached in a comparatively simple manner.

In accordance with the invention these objects are accomplished in that a tubular wrapper mouth is closed with a U-shaped clip and is provided with a hanger loop having two ends, the two non-knotted ends of the hanger loop being slung in at least one convolution around one leg or the cross-piece of the closed clip.

The process object is accomplished in accordance with the invention in that the end of a thread supply is held in position and a tensioned loop is pulled from the thread supply over a snubber so that the side portions of the loop lie beside each other and transverse to the feed path for the clip, the juxtaposed side portions of the loop are placed one over the other so as to cross each other and form an eyelet, which is positioned adjacent to the feed path for the clip, one leg of the U-shaped clip is caused to engage the crossing of the loop and is moved through the eyelet, the clip is closed around the gathered end of the wrapper, and the resulting hanger loop is severed from the thread supply.

The process of attaching the hanger loop according to the invention does not call for inserting a prefabricated hanger loop into the clip or for a formation of partial loops which are used to form behind the clip a knot around the gathered end of the wrapper but comprises the forming of a knot around one leg of the clip. This fixation has the great advantage that the knot is secured by the clamping action of the clip and an unintended loosening of the knot will be reliably prevented even when the hanger loop is not loaded. The process is comparatively simple and highly reliable in operation because the thread loop is taut and positively controlled throughout the operation.

The process according to the invention has proved particularly satisfactory in the prefabrication of wrappers. This term describes the manufacture of wrappers which are closed at one end and which independently of that closing operation are later fitted on the tube of a filling machine and are then filled and subsequently closed at the second end. Because the prefabrication of wrappers is effected at a lower speed than the closing of the wrappers in conjunction with the filling operation, the process according to the invention may be used in conjunction with that prefabrication of wrappers. As a result it is not necessary to use pre-assembled loops in such prefabrication of wrappers. Whereas such pre-assembled loops permit of shorter cycle times, the pre-assembling involves a higher expenditure.

Apparatus which is proposed for carrying out the process comprises a punch, a clip guide having opposite grooves for guiding the clip legs, and a die which receives the clip and cooperates with the punch to close the clip around the gathered end of the wrapper, and is characterized by a rotatable and axially displaceable winding head, which is disposed adjacent to the clip feed path, a thread-withdrawing device, which is disposed beside the clip guide and comprises a thread snubber and deflectors disposed on one side of the clip feed path and a looping hook adapted to be positioned on the other side of the clip feed path, and by drive and control means for moving the looping hook and the winding head in step with the closing machine.

An additional preferred feature of the apparatus resides in that the winding head is provided with a groove in its end face and with a thread-receiving recess, which is somewhat set back from the end face and extends transversely to the axis of the winding head, and that a portion of the groove and the thread-receiving recess define a hook.

The winding head is suitably arranged in such a manner that when the winding head is retracted its groove constitutes the lower end of one of the clip guide grooves and that the winding head is displaceable into the clip feed path toward the opposite clip guide groove and is rotatable about its axis at right angles to the clip feed path.

The thread-withdrawing device is suitably arranged in such a manner that a tensioned thread loop which has been pulled through between the deflecting rollers extends through the clip feed path and is received by the thread-receiving recess of the winding head when the same has been advanced.

Further details of the invention will be explained more fully with reference to an embodiment shown by way of example in the drawings' wherein:

FIG. 2 shows an illustrative embodiment in conjunction with parts of the feeder of a machine for prefabricating wrappers.

Figure 1:
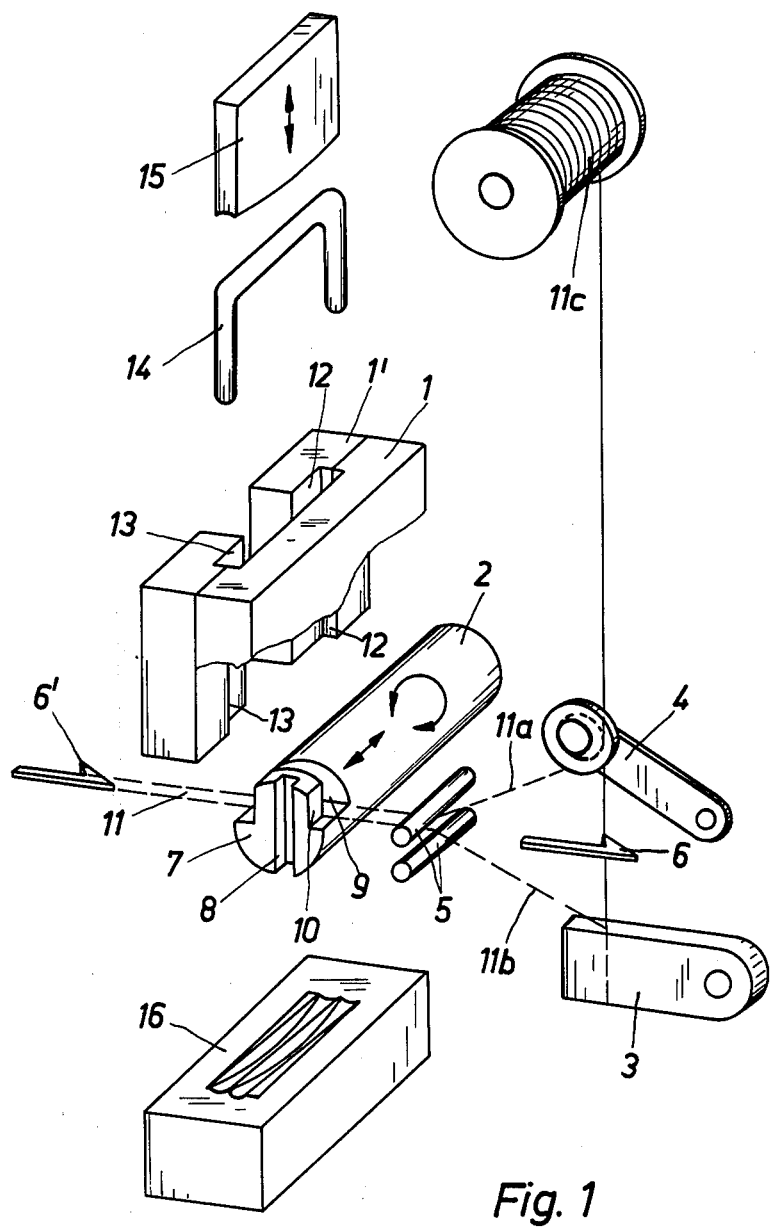
FIG. 1 is a simplified perspective view showing the arrangement of the most important parts of the apparatus according to the invention relative to each other.

FIG. 1 shows a part 1 of a clip guide, which has two opposite grooves 12 and 13, in which the legs of the clip 14 are guided as the clips are advanced by a punch 15. A winding head 2 is adapted to be advanced into the clip guide 1, 1' and is also rotatable about its own axis. The winding head 2 is formed in its end face 7 with a groove 8, which in a certain advanced position of the winding head 2 constitutes a continuation of the clip guide groove 12. The material which surrounds the upper portion of the groove 8 constitutes a hook 10. A thread-receiving recess 9 extends transversely to the axis of the winding head and is disposed behind the hook 10. When the winding head 2 has been advanced, a looping hook 6 is operable to pull a thread loop 11 through the gap between the deflecting rollers 5 so that the upper side portion 11a of the thread loop extends from a thread supply 11c over a thread snubber 4 whereas the side portion 11b of the thread loop is held in position by a thread-withdrawing device 3. When the looping hook is in position 6', it tensions the thread loop 11, which then extends through the thread-receiving recess 9 of the winding head 2 and through the clip guide 1 (this configuration of the thread loop is indicated in dotted lines). A die is disposed below the clip guide 1 and the winding head 2 and serves to receive each clip 14 and to cooperate with the descending punch 15 so as to close the clip.

A practical embodiment of the apparatus basically shown in FIG. 1 is illustrated in FIG. 2 in conjunction with the feeder of a machine for prefabricating wrappers. By means of the feeder, the gathered end 20 of a wrapper is moved to the closing machine. During that movement, the end 20 is held together by a gripper 19. Also during that movement the die 16, which is mounted on a slide 17, and part of the clip guide groove 13, are in a lower position, which is indicated by dotted lines. As will be explained more fully with reference to FIGS. 3 to 7, an eyelet is subsequently formed in the thread loop 11 and extends around the hook 10 of the winding head 2, which is shown in a position in which the groove 8 in its end face is a continuation of one clip guide groove 12. On side portion of the eyelet lies in the thread-receiving recess 9. The other side portion of the eyelet bridges the groove 8. As the clip 14 is advanced by the punch 15, the eyelet is pulled from the hook 10 before the clip 14, which is guided in the grooves 12 and 13 or 13' of the clip guide 1, has reached the die 16 and is closed around the gathered end 20' of the properly positioned wrapper. When the wrapper has been completely closed and provided with a hanger loop at one end 20", the wrapper is removed from the apparatus by a gripper 18. Drive means 30 serve to advance and retract and to rotate the winding head 2.

Figures 3A, 3B:
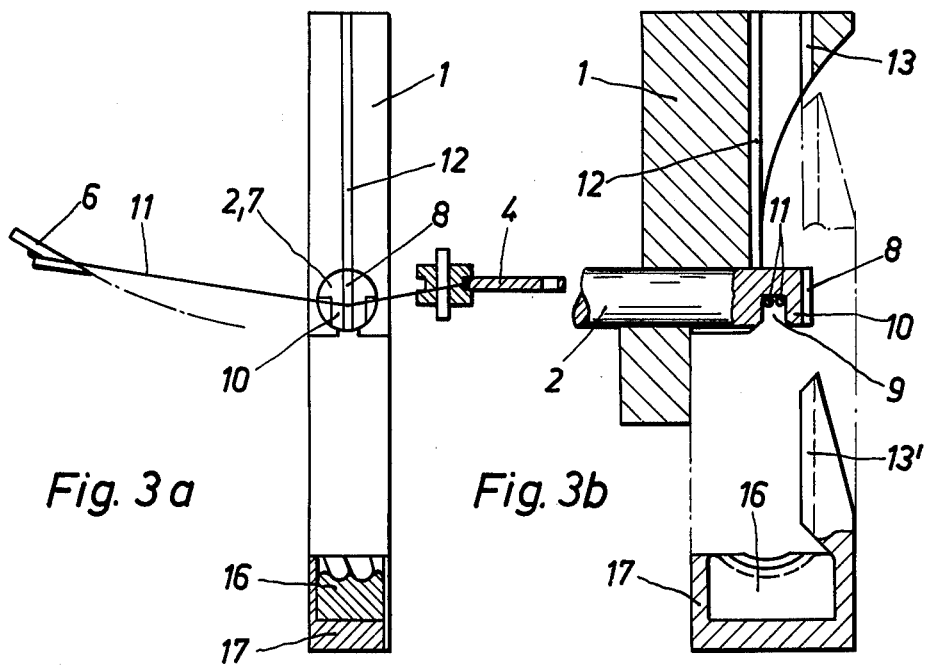
FIGS. 3a and 3b are, respectively, an elevation and a sectional view showing a portion of FIG. 2.

FIG. 3a is a fragmentary view in which part of the clip guide 1 has been omitted so that the clip guide groove 12 and the groove 8 in the end face 7 of the winding head 2 can be shown in elevation. In this position the hook 10 is downwardly directed and the die 16 has been lowered with the slide 17. In that position the looping hook 6 picks up a thread loop 11 in the space between the deflecting rollers 5 and pulls that loop to extend from the thread snubber 4 and transversely through the clip guide 1 and through the thread-receiving recess 9 of the winding head 2.

FIG. 3b is a partly sectional view showing the same parts as FIG. 3a viewed in a direction which is at right angles to the direction of view in FIG. 3a. The slide 17 embraces the die 16 and forms part of the clip guide groove 13'. The winding head 2 has been advanced so that the thread loop 11 can be received in the thread-receiving recess 9. The hook 10 is downwardly directed and the groove 8 is offset to the right from the clip guide groove 12. The winding head 2 is rotatably mounted in the clip guide 1, which is provided with the clip guide grooves 12 and 13.

Figures 4, 5:
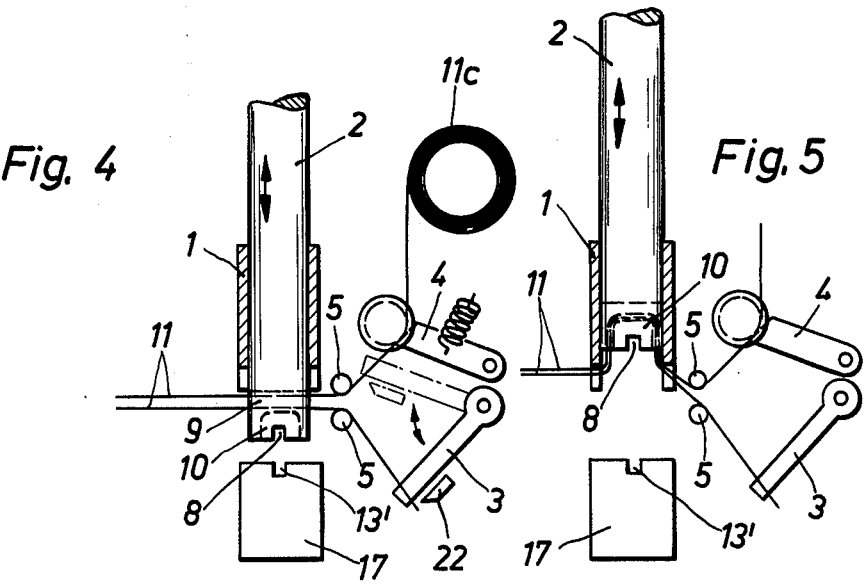
FIGS. 4 to 7 are fragmentary views showing the winding head in successive positions.
Figure 6:
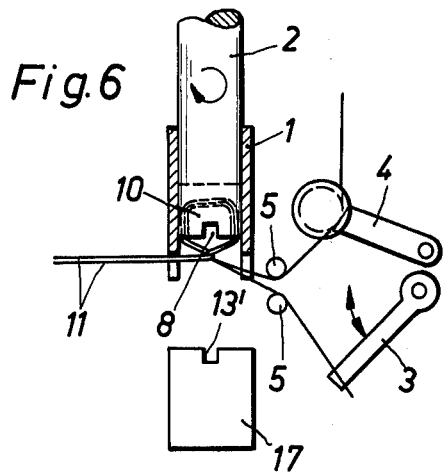

FIG. 4 shows the parts in the same position as in FIGS. 3a and 3b but in a sectional view taken on a plane which extends through the clip guide 1 on the level of the winding head 2. The tensioned thread loop extends from the thread-withdrawing device 3 and the thread snubber 4 around the deflecting rollers 5 and behind the hook 10 through the thread-receiving recess 9. The hook 10 is indicated in dotted lines because it is downwardly directed and in this showing is concealed by the forward portion of the winding head 2, just as the thread loop in that region. The groove 8 of the winding head 2 is opposite to that portion of the clip guide groove 13' which is formed by the slide 17. The pivoted thread-withdrawing device 3 comprises a knife 22 or the like for severing the finished hanger loop from the thread supply 11c when the hanger loop has been connected to the wrapper section and before the thread end for the next hanger loop is gripped (this position is indicated in dotted lines).

Figure 7:
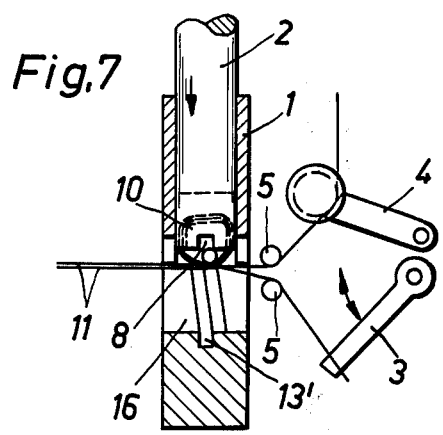
Figure 8:
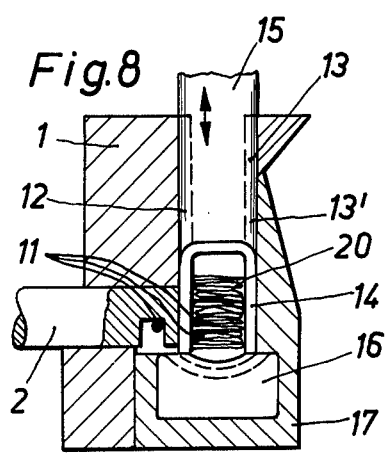
FIG. 8 shows the apparatus shortly before the closing of the clip.
Figure 9:
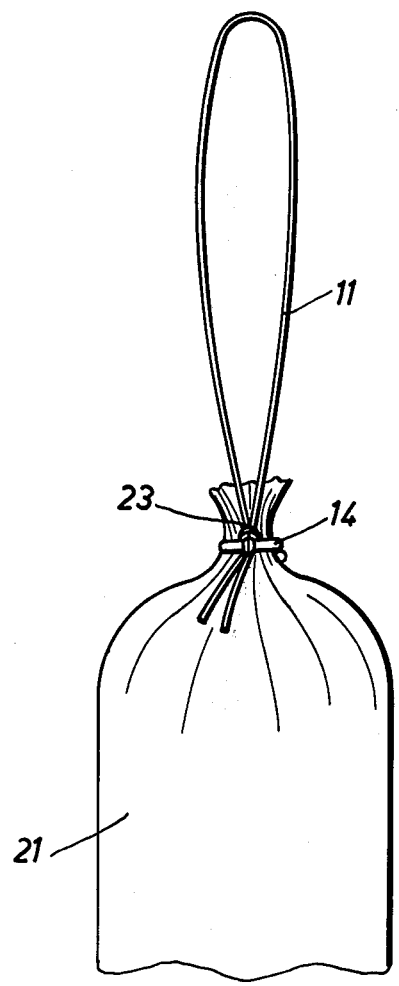
FIG. 9 shows a closed wrapper provided with a clip and a hanger loop.

The same reference characters as in FIG. 4 have been used in FIGS. 5 to 8. In the position shown in FIG. 5, the winding head 2 has been retracted and has taken the thread loop 11 along. The winding head 2 is then rotated through 360° (FIG. 6) so that an eyelet is formed in the thread loop. After the winding head 2 has been rotated, it is advanced to a position in which its groove 8 is aligned with the clip groove 12 (FIG. 7). The slide 17 is advanced at the same time so that the die 16 assumes a clip-closing position. When a clip 14 is now advanced, one of its legs can slide through the clip guide groove 12 and the groove 8 and the eyelet, which has been formed around the hook 10, can be removed from the winding head 2 by said leg (see also FIG. 8). In this operation the clip 14 embraces also the gathered end 20 of the wrapper 21. As the clip is advanced further, it is forced by the punch 15 against the die 16 and is thus closed around the wrapper to close the latter and to tie in the thread loop 11 at the same time so that the thread loop can subsequently be used as a hanger loop for the wrapper 21 (FIG. 9). As the thread loop is tied in, a knot 23 is formed, which is reliably fixed by the clamping action of the clip 14 and under load can possibly be tightened further but can never become loose.

Figure 10:
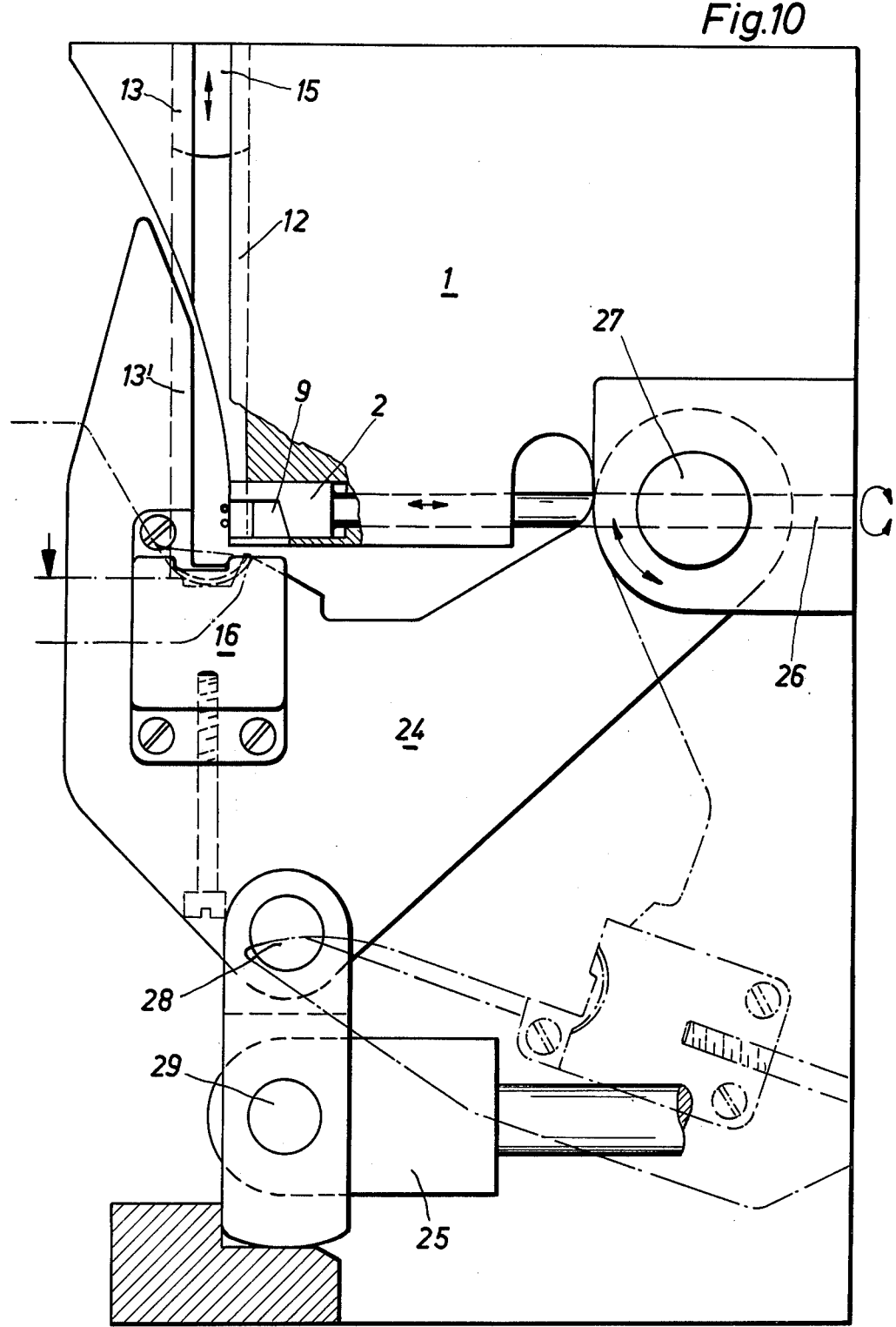
FIG. 10 shows another embodiment in a view which is similar to FIG. 2.

FIG. 10 shows an alternative arrangement for moving the die. The die 16 and part of the clip guide groove 13' are mounted on a pivoted arm 24, which is rotatable around the pivot 27 and is pivotally moved by means of the driven rod 25, which is articulated connected at 28, 29. All other parts are the same as in FIG. 2.

It will be appreciated that the instant specification and examples are set forth by way of illustration and not limitation, and that various modifications and changes may be made without departing from the spirit and scope of the present invention.

What is claimed is:

1. A process for attaching a hanger loop to a gathered mouth of a tubular wrapper and for closing the mouth with a U-shaped clip, comprising pulling a thread from a supply to form a loop, both side portions of which are extended into the feed path for the clip, displacing the two side portions of the loop transversely of the longitudinal extension of the loop and then twisting them so as to cross each other and form an eyelet independent of the loop, positioning the eyelet in the feed path for the clip, advancing the clip so that one leg engages the crossing of the loop and is then moved through the eyelet, and then closing the clip around the mouth, the clip thereby securing the thread and its loop to the gathered mouth of the wrapper.

* * * * *